Jan. 3, 1933.   J. A. McGREW   1,893,032
SIX-WHEELED MOTORIZED TRUCK
Original Filed Aug. 21, 1926   4 Sheets-Sheet 1
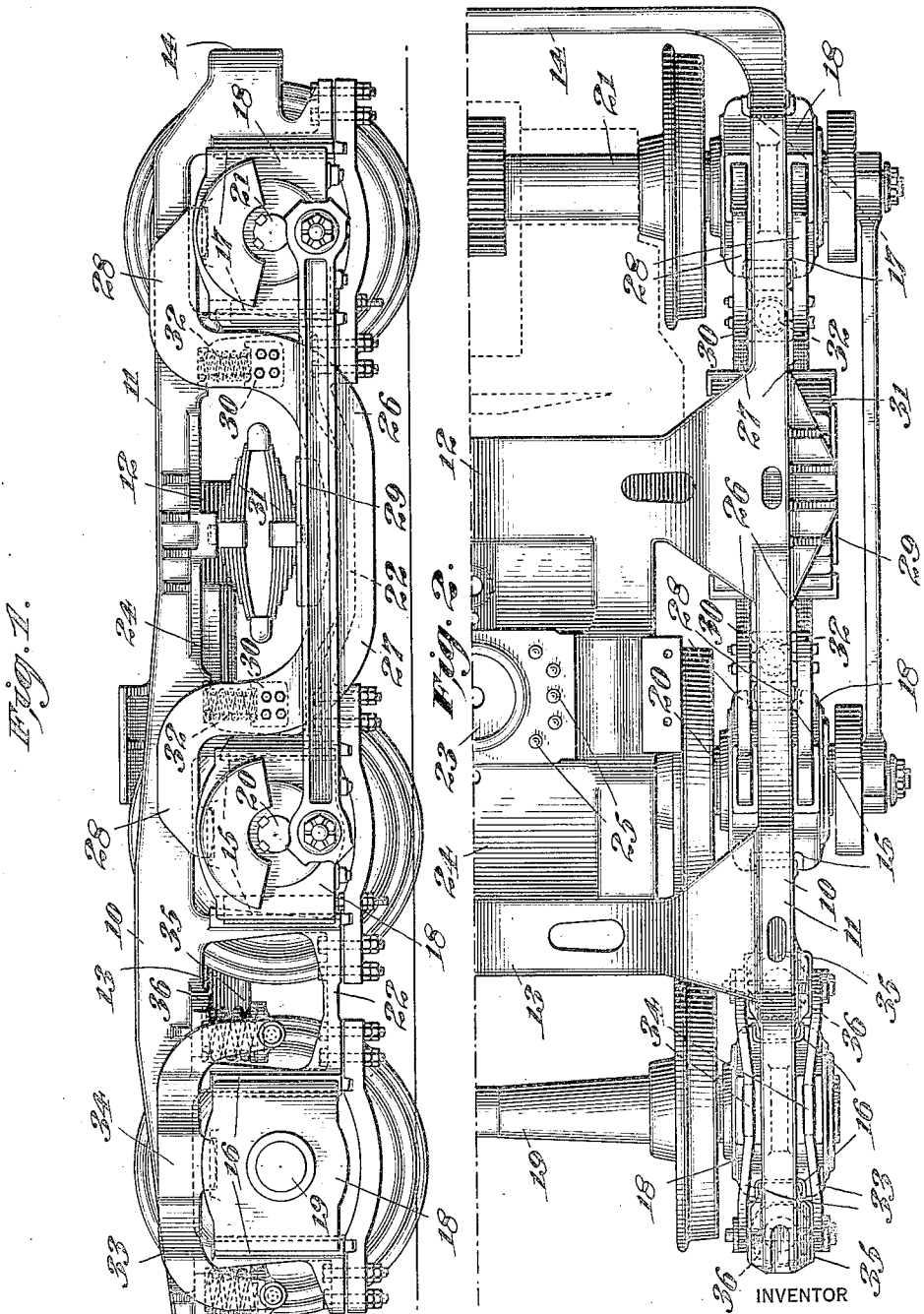
INVENTOR
John A. McGrew.
BY
R. S. A. Dougherty
ATTORNEY

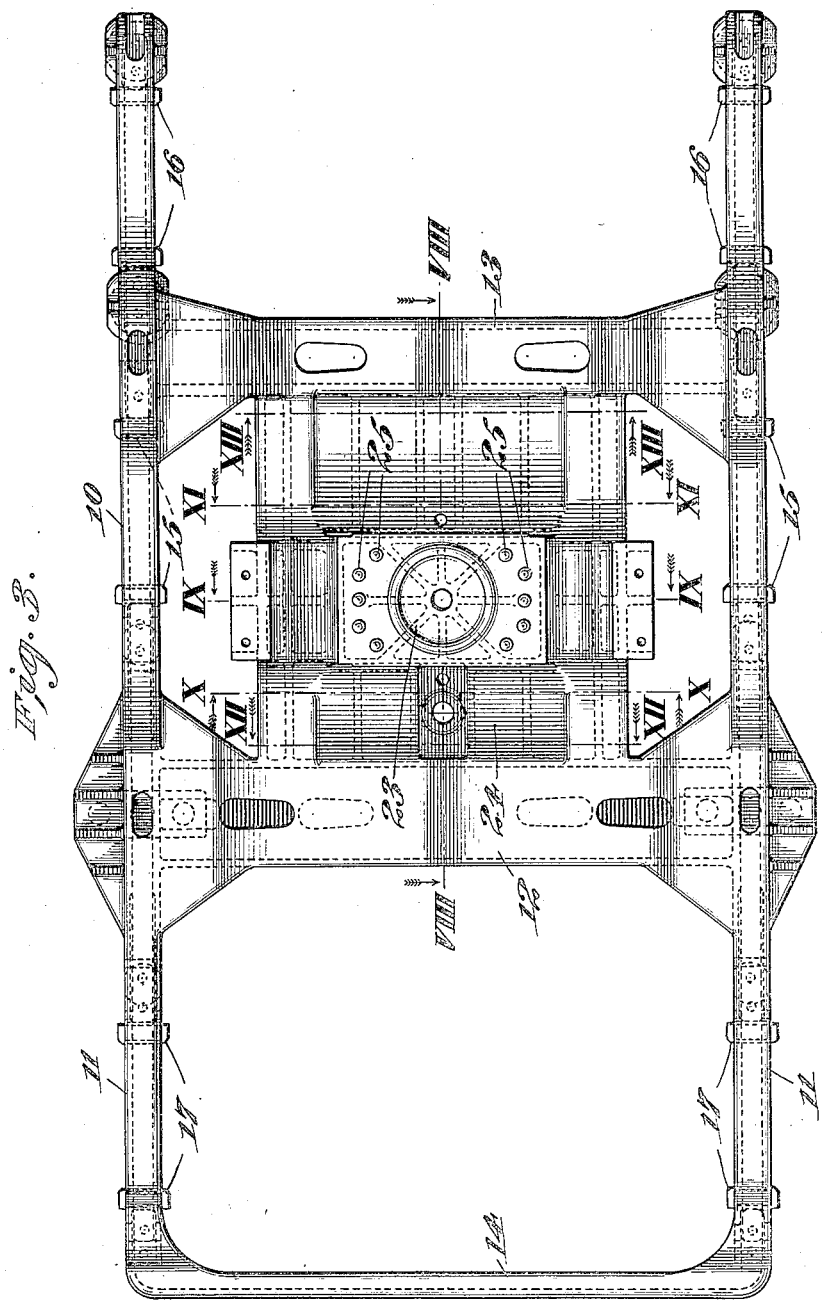

Jan. 3, 1933. J. A. McGREW 1,893,032
SIX-WHEELED MOTORIZED TRUCK
Original Filed Aug. 21, 1926 4 Sheets-Sheet 3
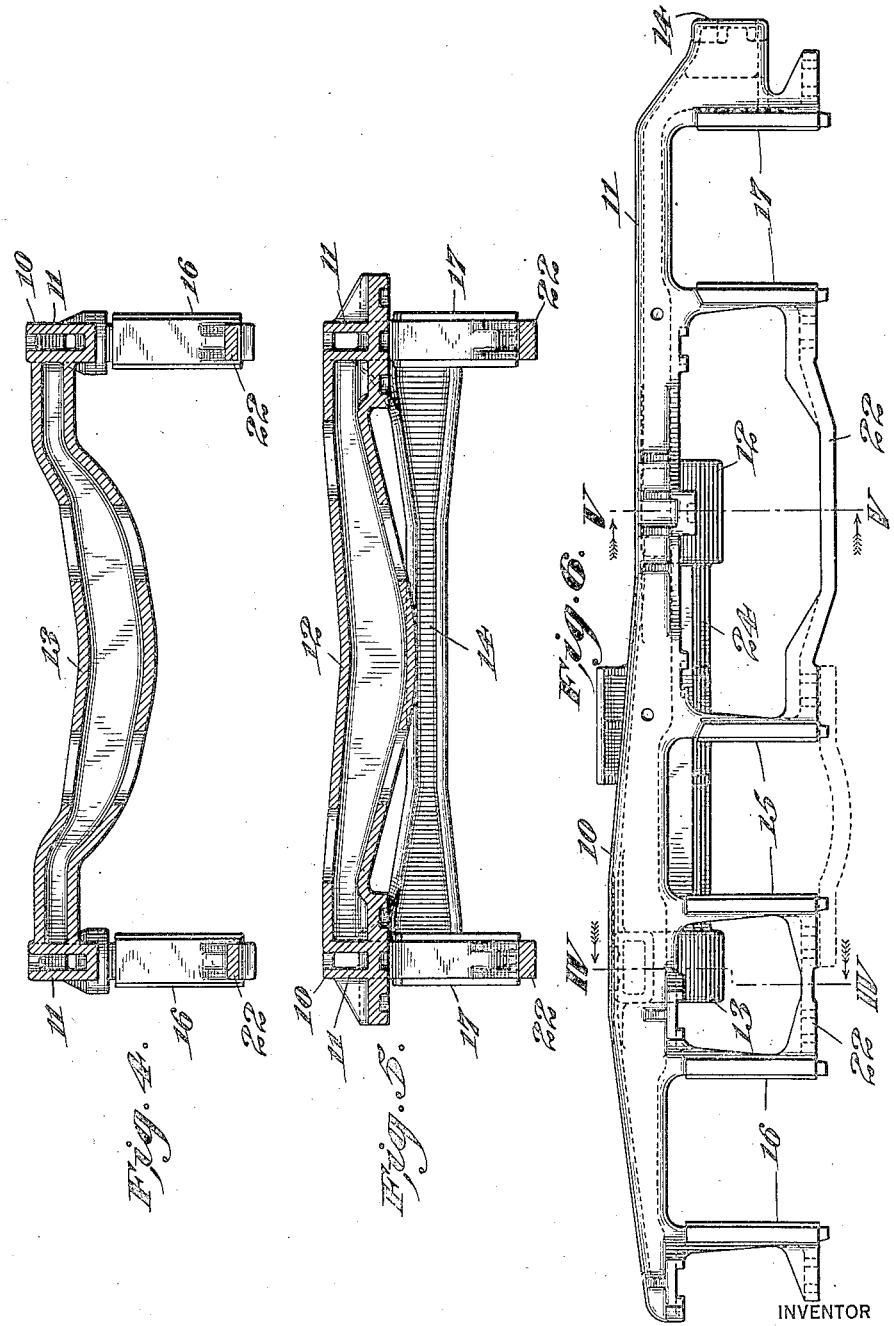
INVENTOR
John A. McGrew.
BY
R. S. C. Dougherty
ATTORNEY

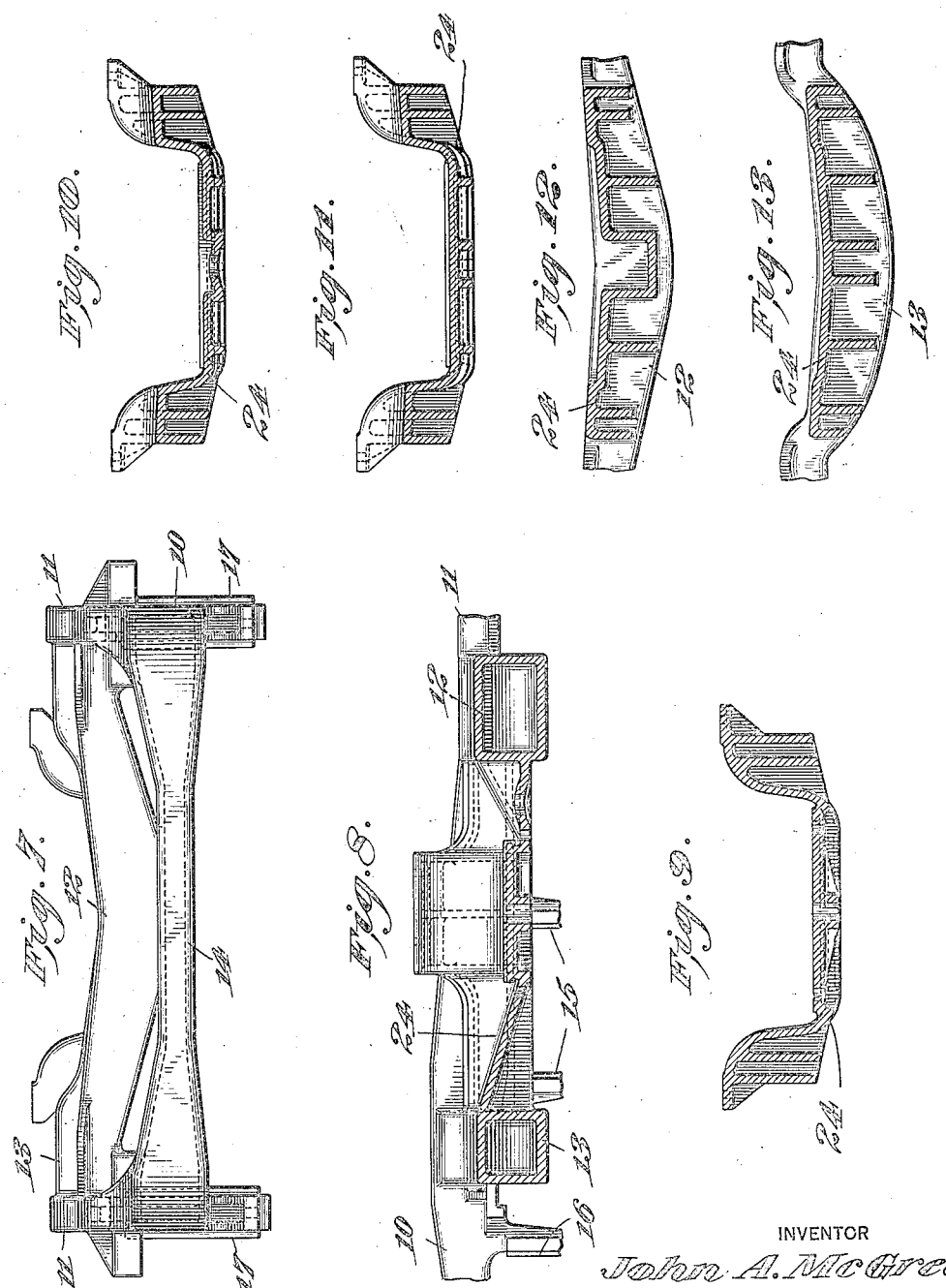

Patented Jan. 3, 1933

1,893,032

UNITED STATES PATENT OFFICE

JOHN A. McGREW, OF ALBANY, NEW YORK, ASSIGNOR TO BETHLEHEM STEEL COMPANY

SIX-WHEELED MOTORIZED TRUCK

Application filed August 21, 1926, Serial No. 130,593. Renewed February 10, 1930.

My invention relates to a railway vehicle truck and more particularly, to trucks of the six-wheeled type.

My invention has for its primary object and purpose to provide a six-wheeled truck construction suitable for the application of an auxiliary locomotive thereto.

Another object of my invention is to provide a motorized six-wheeled truck having the axles thereof spaced to accommodate the motor intermediate a pair of axles and the truck frame of such construction that the load supported by the truck is more or less equally distributed between the three axles without increasing the convenitional distance between the outer axles.

The novel feature of my invention will be more fully understood from the following description and claims taken with the drawings in which:

Fig. 1 is a side elevation of a truck showing an embodiment of my invention.

Fig. 2 is a partial plan view of Fig. 1.

Fig. 3 is a plan view of the truck frame.

Fig. 4 is a cross sectional taken on line IV—IV in Fig. 6.

Fig. 5 is a cross section taken on line V—V in Fig. 6.

Fig. 6 is a side elevation of the truck frames.

Fig. 7 is an end elevation of the truck frame.

Fig. 8 is a cross section taken on line VIII—VIII in Fig. 3.

Fig. 9 is a cross section taken on line IX—IX in Fig. 3.

Fig. 10 is a cross section taken on line X—X in Fig. 3.

Fig. 11 is a cross section taken on line XI—XI in Fig. 3.

Fig. 12 is a cross section taken on line XII—XII in Fig. 3.

Fig. 13 is a cross section taken on line XIII—XIII in Fig. 3.

Referring to the drawings: 10 indicates a truck frame preferably of integral construction and comprising spaced wheel pieces 11, bolster 12, transom 13 and cross-tie 14. Depending from the wheel pieces 11 are three pairs of pedestals, an intermediate pair 15 and two outer pairs 16 and 17 respectively. The pedestals are adapted to receive the bearing boxes 18 in which the axles 19, 20 and 21 are journaled respectively. Adjacent pedestals are connected to each other, at their ends, by the brace members 22. The bolster 12 and the transom 13 are preferably of hollow box section form and gradually increase in depth longitudinally toward the center, as shown in Figs. 4 and 5 respectively, to efficiently resist the bending stresses imposed thereon.

In order to apply an auxiliary locomotive to a six-wheeled truck, intermediate a pair of axles, it is preferable that two of the axles be spaced apart far enough to accommodate the engine and the frame. In order to conform with conventional practice with regards to spacing of the outer axles, it is necessary to have the other axle spaced fairly close to the intermediate axle.

It is essential that the load, carried by the truck, be distributed uniformly to all of the axles and to this end the transom 13 is placed intermediate the axles 19 and 20 which are spaced closely together, and the bolster 12 is placed midway between the axles 20 and 21, which are spaced sufficiently to accommodate the auxiliary locomotive frame. In order that the load is distributed to the axles uniformly, the bearing plate 23 is located at a determined point intermediate the bolster and the transom. Hence, the truck frame is constructed with a longitudinal beam or span member 24 which connects the bolster 12 and the transom 13; and the bearing plate 23 is located along the span member 24 at such a point as to secure equal division of the load among the axles.

It will be noted that the bearing plate 23 is detachably secured, by means of bolts or rivets 25, to the span member 24, so that the motorized six-wheeled truck may be readily adapted to fit any standard type of center bearing on a railway vehicle designed for a six-wheeled truck.

An equalizer device 26 is provided at each side of the truck frame 10. The device 26 comprises a pair of U-shaped members 27 having horizontally extending ends 28. The members 27 are positioned at each side of the wheel pieces 11 and are connected together by the spring seat 29 and the transverse brackets 30. The ends 28 of the members 27 rest on the boxes in which the axles 20 and 21 are journaled, respectively, and a suitable spring 31 is interposed between the spring seat 29 and the frame 10. Suitable coil springs 32 are interposed between the brackets 30 and the frame 10, as shown in Fig. 1.

The frame 10 is supported on the axle 19 by the medium of a spring device 33 disposed at each side of the frame. The spring device 33 comprises a pair of inverted U-shaped bar members 34, one of which is disposed at each side of the wheel piece 11, interconnected at their respective ends by the hinged spring plates 35. The bar members 34 bear on the box in which the axle 19 is journaled and suitable coil springs 36 are interposed between the spring plates 35 and the truck frame 10.

The span member 24 may be regarded as a beam to which the load is applied at the bearing plate 23. Whatever load is applied by the span member 24 is transmitted to the bolster 12 and the transom 13. The distribution of weight is such, that the span, transom, bolster and wheel pieces function as a beam in their entirety with two points of application of the load carried thereby, at each side of the truck viz. one point at each side, half-way between the axles 20 and 21, and the other point at each side directly over the axle 19, with the center plate so located on the span that it is respectively one-third and two-thirds of the total distance between such points of application. The springs 36 are of such relative capacity that none of the load carried over axle 19 will be thrown back along the wheel pieces to be applied to springs 31.

It will be seen from the above description that I have devised a frame construction which is particularly suitable for embodiment in a six-wheeled motorized truck and which is easily adaptable to various loading conditions to assure the load being uniformly distributed to each of the axles.

While I have shown my invention in but one form, it will be obvious to those skilled in the art, that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent is:

1. In a six-wheeled truck, in combination, a pair of wheel pieces, a transom member, a bolster member, a span member, a bearing plate member on said span member, a pair of spaced axles, an equalizer device bearing on said axles and having its midway point disposed beneath the center line of the bolster member, a third axle, an inverted U-shaped member extending across and bearing on the latter, and springs interposed between the extending ends of said U-shaped member and said wheel pieces.

2. In a six-wheeled truck, in combination, a frame comprising a pair of wheel pieces, a bolster, a transom and a span member connecting said transom to said bolster, a pair of spaced axles, a pair of equalizer members straddling said wheel pieces respectively, and supported on said axles, the midway point of said equalizer members being disposed beneath and in alignment with the center line of said bolster, resilient means interposed between said equalizer members and said frame, a bearing plate mounted on said span member, a third axle, bar members extending across and bearing at their midway point on the latter axle, and straddling said wheel pieces respectively, and resilient means interposed between the bar members and said frame.

3. In a six-wheeled truck, in combination, a frame comprising a pair of wheel pieces, a bolster, a transom and a span member connecting said transom to said bolster, a pair of spaced axles, a pair of equalizer members straddling said wheel pieces respectively, and supported on said axles, the midway point of said equalizer members being disposed beneath and in alignment with the center line of said bolster, resilient means interposed between said equalizer members and said frame, a bearing plate mounted on said span member, a third axle, located along the frame at a distance from the intermediate axle which is materially less than the distance between the first mentioned pair of axles, bar members extending across and bearing at their midway point on the latter axle and straddling said wheel pieces respectively, and resilient means interposed between the bar members and said frame.

4. In a six-wheeled truck, in combination, a frame, a plurality of axles spaced at unequal distances apart with respect to one another, and resilient means interposed between said frame and said axles; said frame comprising an integral structure provided with a pair of wheel pieces, pedestals formed therewith, a transom member, a bolster member, a span member connecting the latter members, and a bearing plate mounted on said span member whereby the load carried by said frame is equally distributed to each of said axles.

5. In a wheeled truck, in combination, a frame, a plurality of unequally spaced axles, an equalizer means supported on a pair of axles, means to support said frame on said equalizer means so that a load thereon will be equally distributed between said pair of axles, means to support said frame on another of said axles, and a bearing plate positioned on said frame so that a load applied thereto will be distributed substantially equally between each of said axles.

6. In a wheeled truck, in combination, three axles unequally spaced apart, an equalizer means supported on the pair of axles which are spaced the greatest distance apart, resilient means supported on said equalizer means at a point midway between said pair of axles, a second resilient means centrally supported on the third axle, and a frame supported on said resilient means.

7. In a wheeled truck, in combination, three axles, an equalizer means supported on a pair of said axles, resilient means supported on said equalizer means at a point midway between said pair of axles, a second resilient means centrally supported on the third axle, and a frame supported on said resilient means.

8. In a wheeled truck, in combination, three axles unequally spaced apart, an equalizer means supported on the pair of axles which are spaced the greatest distance apart, resilient means supported on said equalizer means at a point midway between said pair of axles, a second resilient means supported on the third axle, a frame supported on said resilient means, and a bearing plate positioned on said frame so that a load applied thereto will be distributed substantially equally between each of said axles.

9. In a wheeled truck, in combination, a frame, a pair of spaced axles, an equalizer device bearing on said axles, means to support said frame on said equalizer device at a point midway between said axles, a third axle, an inverted U-shaped member extending across and bearing on the latter, and means bearing on the extending ends of said U-shaped member for supporting said frame.

10. In a wheeled truck, in combination, a frame comprising a pair of wheel pieces, a pair of spaced axles, a pair of equalizer members straddling said wheel pieces respectively and supported on said axles, means bearing at the midway point of said equalizer members for supporting said frame, a third axle, bar members extending across and bearing at their midpoint on the latter axle and straddling said wheel pieces respectively, and means bearing on said bar members for supporting said frame.

11. In a wheeled truck, in combination, a frame comprising a pair of wheel pieces, a pair of spaced axles, a pair of equalizer members straddling said wheel pieces respectively and supported on said axles, means bearing on said equalizer members for supporting said frame, a third axle located along said frame at a distance from the intermediate axle which is materially less than the distance between the first mentioned pair of axles, bar members extending across and bearing at their midway point on the latter axle and straddling said wheel pieces respectively, and means bearing on said bar members for supporting said frame.

12. In a wheeled truck, in combination, a pair of spaced axles, an equalizer means bearing on said axles, a supporting means bearing on said equalizer means so that a load thereon will be equally distributed between said axles, a third axle mounted in unequal spaced relation with the pair of axles, a second supporting means bearing on said third axle so that a load thereon will be wholly supported by the latter axle, and a frame supported on said supporting means.

13. In a wheeled truck, in combination, a frame, a pair of spaced axles, an equalizer means bearing on said axles, means for supporting said frame bearing on said equalizer means so that a load thereon will be distributed equally between said axles, a third axle located along said frame at a distance from the intermediate axle which is materially less than the distance between the first mentioned axles, means for supporting said frame bearing on said third axle, and a bearing plate disposed on said frame so that the horizontal distance at the right angles to said axles from a plane passing through its center to the midway of said equalizer means is approximately half the distance from said plane to the axis of the third axle.

14. In a six-wheeled truck, in combination, a frame, a plurality of axles spaced at unequal distances apart with respect to one another, equalizing members mounted on either side of the frame and supported on the axles, and resilient means interposed between said frame and the equalizer bars supported on said axles; said frame comprising an integral structure provided with a pair of wheel pieces, unequally spaced pedestals formed integral therewith, bearing boxes in said pedestals in which said axles are journaled, a transom member, a bolster member, a span member connecting the latter members, and a bearing plate mounted on said span member whereby the load carried by said frame is equally distributed to each of said axles.

In testimony whereof I hereunto affix my signature.

JOHN A. McGREW.